3,368,912
DECORATIVE CRYSTALLIZATION PROCESS
Dionysios M. Adamis, 7 Dexter Road,
Wellesley, Mass. 02181
No Drawing. Filed Sept. 10, 1964, Ser. No. 395,546
4 Claims. (Cl. 117—42)

This invention consists in a method of producing decorative crystallization patterns and in the article so produced.

I have found a variety of attractive patterns ranging from fine to coarse in texture, and from an angular or geometric effect to a feathery, leafy or branched effect may be produced by causing sodium barbital (sodium 5,5-diethylbarbiturate) to crystallize in the presence of a gel forming substance under controlled conditions of concentration and pH. The process of crystallization is easily carried out, simply by forming a solution of sodium barbital containing a gel forming substance and an amount of acid to control the pH, to between 5.5 and 9.0, preferably 5.8–8.6, spreading the solution on a surface, preferably glass, and allowing it to evaporate. The product thus initially formed is initially a white array of crystals having variations in density and producing a decorative effect. Attractive color patterns may be formed by applying dyestuffs dissolved in a nonsolvent such as alcohol. These may be applied drop-wise, each drop spreading out to the extent of its volume and taking on the gradiations of intensity present in the uncolored base material, or by spraying, brushing or dripping. Where several different colors are applied, they may be so close together as to intermingle and give attractive color gradations.

A representative method for producing a crystallization pattern is as follows:

*Example I*

To 50 milliliters of a 0.2 M aqueous solution of sodium barbital is added an amount of 0.2 M hydrochloric acid solution, between 1.5 and 45 milliliters, depending on the effect to be obtained, and water is then added to bring the total volume to 200 milliliters.

To one-half of this (100 milliliters) is added 0.1 to 2 grams of bovine fibrinogen. The mixture is incubated at 37° C. for 15 minutes. Ten units of bovine thrombin are added and mixed in thoroughly, and the solution is poured immediately onto the surface of a sheet of glass at room temperature. The fibrinogen polymerizes within 30–40 seconds and forms a gel medium in which crystallization of the sodium barbital occurs, during the evaporation of the water.

After evaporation has been completed the glass with the adherent crystals is placed in an oven at 80° C. for about 15 minutes to dry the product thoroughly.

Coloring may now be applied, preferably from alcoholic solution of such dyes as methyl red, methyl red O, Nile blue A, Cotton blue, fuchsine and other alcohol soluble dyestuffs.

As an alternative procedure for coloring the design, certain dyes may be dissolved in the initial sodium barbital solution to cause a colored crystal pattern to form initially. The addition of 30–50 milligrams of indicator methyl red to 100 milliliters of sodium barbital solution gives yellow crystal patterns on evaporation of the gel forming mixture. Methyl orange also gives a yellow color and Cotton blue C4B produces purple colored crystals.

The crystal effect achieved varies considerably depending on the pH, the rate of evaporation, and the concentration.

At a low pH a branched pattern having a coarse texture tends to form; at higher pH's a finer texture is produced.

At high concentrations of sodium barbital dense branches are formed, many close together; at low concentration the branches tend to be sparse and spread apart.

Evaporation at higher rates tends to produce thin branches similar to the effect of a high pH; at a slower evaporation rate the branches becomes thicker similar to the effect of a low pH.

Other gel media bring about different effects, for instance if agar is employed in place of the fibrinogen-thrombin large crystals with intersecting straight lines tend to form producing a geometric pattern.

The pH may be controlled by means of acids other than hydrochloric. For instance, using acetic acid to bring the pH to 7.2 produces an effect closely similar to that obtained when using hydrochloric. Sulfuric acid added to bring the pH to 7.8 resulted in a pattern of geometrically concentric rings; trichloroacetic acid at the same pH resulted in a striated effect.

Having thus disclosed my invention and described in detail preferred embodiments thereof, I claim and desire to secure by Letters Patent:

1. The method of producing crystalline designs comprising forming an aqueous solution containing sodium barbital and a gel forming substance and having a pH between 5.5 and 9.0, spreading a layer of said solution on the surface to be decorated, and allowing said solution to dry.

2. The method of producing crystalline designs comprising forming an aqueous solution containing sodium barbital and a gel forming substance selected from the group consisting of fibrinogen-thrombin and agar and having a pH between 5.5 and 9.0, spreading a layer of said solution on the surface to be decorated and allowing said solution to dry.

3. The method of producing crystalline designs comprising forming an aqueous solution containing sodium barbital and a gel forming substance and having a pH between 5.5 and 9.0, spreading a layer of said solution on the surface to be decorated, allowing said solution to dry, and applying coloring to the dried layer.

4. The method of producing crystalline designs comprising forming an aqueous solution containing sodium barbital, a dyestuff, and a gel forming substance and having a pH between 5.5 and 9.0, spreading a layer of said solution on the surface to be decorated and allowing said solution to dry.

References Cited

UNITED STATES PATENTS

| 2,415,775 | 2/1947 | Waldie et al. | 117—42 |
| 2,199,227 | 4/1940 | Marks | 117—42 |

ALFRED L. LEAVITT, *Primary Examiner.*

A. GRIMALDI, *Assistant Examiner.*